United States Patent
Martin

(10) Patent No.: US 7,968,628 B2
(45) Date of Patent: Jun. 28, 2011

(54) MODIFIED ASPHALT BINDER MATERIAL USING CROSSLINKED CRUMB RUBBER AND METHODS OF MANUFACTURING THE MODIFIED ASPHALT BINDER

(75) Inventor: Jean-Valery Martin, Hopewell, NJ (US)

(73) Assignee: Innophos, Inc., Cranbury, NJ (US)

( * ) Notice: Subject to any disclaimer, the term of this patent is extended or adjusted under 35 U.S.C. 154(b) by 0 days.

(21) Appl. No.: 12/197,099

(22) Filed: Aug. 22, 2008

(65) Prior Publication Data

US 2009/0053405 A1 Feb. 26, 2009

Related U.S. Application Data

(63) Continuation of application No. 11/416,676, filed on May 3, 2006, now Pat. No. 7,417,082.

(60) Provisional application No. 60/677,402, filed on May 3, 2005.

(51) Int. Cl.
  *C09D 195/00* (2006.01)
(52) U.S. Cl. .......... 524/68; 524/71; 524/60; 106/273.1; 106/277; 106/281.1; 106/284.1
(58) Field of Classification Search ............... 106/273.1, 106/277, 281.1, 284.1; 524/60, 68, 71
  See application file for complete search history.

(56) References Cited

U.S. PATENT DOCUMENTS

| | | | |
|---|---|---|---|
| 4,330,449 A | | 5/1982 | Maldonado et al. |
| 5,095,055 A | * | 3/1992 | Moran ............................ 524/59 |
| 5,501,730 A | * | 3/1996 | Duong et al. ............... 106/281.1 |
| 5,618,862 A | | 4/1997 | Germaaud et al. |
| 5,710,196 A | | 1/1998 | Willard |
| 5,880,185 A | | 3/1999 | Planche et al. |
| 5,990,207 A | | 11/1999 | Perret et al. |
| 6,011,095 A | | 1/2000 | Planche et al. |
| 6,346,561 B1 | | 2/2002 | Osborn |
| 6,706,787 B1 | | 3/2004 | Burris et al. |
| 6,818,687 B2 | * | 11/2004 | Memon ........................... 524/68 |
| 7,074,846 B2 | * | 7/2006 | Sylvester et al. ............... 524/71 |
| 7,446,139 B2 | * | 11/2008 | Martin ............................ 524/68 |
| 2003/0018106 A1 | * | 1/2003 | Sylvester ........................ 524/60 |
| 2006/0089429 A1 | | 4/2006 | Buras et al. |
| 2006/0250886 A1 | | 11/2006 | Dupuis et al. |

FOREIGN PATENT DOCUMENTS

FR 2732702 10/1996

OTHER PUBLICATIONS

English Language Abstract of FR2732702.

* cited by examiner

*Primary Examiner* — David M Brunsman
(74) *Attorney, Agent, or Firm* — McCarter & English, LLP

(57) ABSTRACT

Bituminous asphalt binder materials which are modified by the addition of crumb rubber or ground tire rubber and a cross-linking agent are described. In addition, methods are provided for producing a modified asphalt binder containing crumb rubber or ground tire rubber and a cross-linking agent. The modified asphalt binders comprise neat asphalt, crumb rubber, one or more acids and a cross-linking agent. Optionally, the modified asphalt binder may include one or more polymer additives. The crumb rubber may be obtained from recycled truck and/or automobile tires. The addition of crumb rubber in asphalt binders can improve the consistency and properties of the asphalt binders at high and low temperatures. In particular, the modified asphalt binders of the present invention exhibit improved elastic behavior, resulting in improved performance of roads or other surfaces paved using the modified asphalt binder. Road resistance to permanent deformation, fatigue cracking and thermal cracking is improved by use of the modified asphalt binder.

10 Claims, No Drawings

MODIFIED ASPHALT BINDER MATERIAL USING CROSSLINKED CRUMB RUBBER AND METHODS OF MANUFACTURING THE MODIFIED ASPHALT BINDER

CROSS-REFERENCE TO PRIORITY APPLICATION

This application is a continuation of U.S. patent application Ser. No. 11/416,676, filed May 3, 2006, now U.S. Pat. No. 7,417,082, which claims priority to U.S. Provisional Patent Application Ser. No. 60/677,402, filed May 3, 2005, both of which are incorporated herein by reference as part of the present disclosure.

FIELD OF THE INVENTION

The present invention is directed, in one aspect, to bituminous asphalt binder materials which are modified by the addition of crumb rubber or ground tire rubber and a cross-linking agent. In a second aspect, the present invention is directed to methods of producing a modified asphalt binder containing crumb rubber or ground tire rubber and a cross-linking agent. The modified asphalt binders of the present invention comprise neat asphalt, crumb rubber, one or more acids and a cross-linking agent. Optionally, the modified asphalt binder may include one or more polymer additives. The crumb rubber may be obtained from recycled truck and/or automobile tires.

The addition of crumb rubber in asphalt binders can improve the consistency and properties of the asphalt binders at high and low temperatures. In particular, the modified asphalt binders of the present invention exhibit improved elastic behavior, resulting in improved performance of roads or other surfaces paved using the modified asphalt binder. Road resistance to permanent deformation, fatigue cracking and thermal cracking is improved by use of the modified asphalt binder. The addition of the cross-linking agent may also improve the stability of the modified asphalt binder for storage.

BACKGROUND

As used herein and in the claims, the phrase "asphalt binder" refers to a bituminous material, sometimes referred to as bitumen, used as a binder in asphalts used to pave roads or other surfaces, or used in construction materials such as roofing materials, coatings, and water sealants. Examples of bitumen that may be used in the compositions and methods of the present invention include natural bitumens, pyrobitumens and artificial bitumens. Bitumens that are particularly preferred are those used for roadways, such as asphalt or maltha. Asphalt paving material is made by mixing the asphalt binder with aggregate.

As used herein and in the claims, the phrase "crumb rubber" refers to rubber particles which have a particle size of less than about 5 mm, and preferably have a particle size of less than about 2 mm. Crumb rubber may be obtained from grinding of used truck tires or automobile tires, or from any other appropriate source of ground rubber.

The use of crumb rubber and polyphosphoric acid in asphalt binders was described previously in publication number WO 04/081098, titled "Bituminous Binder and Method for the Production Thereof." As described in that published patent application, by combining between 0.5% by weight to 5% by weight polyphosphoric acid, and between 0.5% by weight to 25% by weight crumb rubber (or ground tire rubber) with the bituminous asphalt binder, the properties of the asphalt binder may be advantageously modified without increasing the rotational viscosity such that the mixing process requires high temperature conditions.

Asphalt binders are frequently used in applications where there can be a wide variation in environmental conditions, particularly when used in pavements. Accordingly, the properties of the asphalt binder in high and low temperature conditions is a concern. At low temperatures, some binder materials can become brittle, leading to long transverse fissures due to thermal stress. At higher temperatures, the asphalt binder becomes more fluid (i.e. the viscosity is lower), which can lead to rutting of a pavement due to the passage of vehicles over the surface. Resistance to fatigue and impact, and the adherence of the asphalt binder to aggregate in paving applications, are properties of a particular binder that also must be considered in particular applications.

Some asphalt binders may require a relatively high elastic behavior, for example where the corresponding asphalt paving mixture is used in areas of high traffic rates and high loads. Crumb rubber (or ground tire rubber), used alone or used in combination with polyphosphoric acid, does not sufficiently improve the elastic behavior of the asphalt paving mixture for high traffic and high load uses. When a high elasticity is required, large amounts of crumb rubber must be added to the asphalt binder. This can cause an undesirable increase in rotational viscosity, as well as problems related to storage of the binder material.

Accordingly, among the objects of the present invention is to provide an asphalt binder material with a relatively high elasticity, an acceptable rotational viscosity, and that can be stored for adequate periods of time. Another object of the present invention is to provide methods of making an asphalt binder having these properties.

SUMMARY OF THE INVENTION

In one aspect, the present invention is directed to a modified asphalt binder material comprising asphalt, crumb rubber, one or more acids, a cross-linking agent, and, optionally, one or more polymers. In one embodiment of the invention, neat asphalt is modified by adding 0.5% to 30% by weight of crumb rubber, 0.05% to 5% by weight of one or more acids, and 0.01% to 5% by weight of a cross-linking agent. The modified asphalt binder may also include between 0.5% by weight and 30% by weight of one or more polymer additives. The asphalt binders of the present invention typically have between about 10% to about 90% elastic recovery under a standard elastic recovery test, such as the test protocols set forth in AASHTO T51, ASTM D6084-04, NLT329 or other standard tests.

In another aspect, the present invention is directed to methods of producing a modified asphalt binder material comprising asphalt, crumb rubber, one or more acids, one or more cross-linking agents, and, optionally, one or more polymers.

In yet another aspect, the modified asphalt binders of the present invention may be mixed with water and an emulsifier to form a emulsion. The emulsified asphalt binder may be mixed with an aggregate material, spread to form a layer of the desired thickness, and the emulsion will be broken to form an asphalt pavement. Alternatively, the emulsified asphalt binder may be spread upon a surface, an aggregate material may be spread over the emulsified binder, and the emulsion may be broken.

DESCRIPTION OF PREFERRED EMBODIMENTS

The present invention is directed to modified asphalt binders and methods of making modified asphalt binders. The modified asphalt binders comprise neat asphalt, crumb rubber, one or more acids, and one or more cross-linking agents. Optionally, the compositions may further include one or more polymers. It will be understood that "crumb rubber" as used herein includes crumb rubber, such as ground tire rubber or any other rubber provided in particle form suitable for mixture with an asphalt binder. Typically, a substantial portion of the crumb rubber will have a particle size less than about 5 mm, preferably less than about 2 mm, and more preferably less than 1 mm. The invention is not limited in this regard, and the crumb rubber may have any particle size distribution that results in an asphalt binder with the desired properties.

The modified asphalt binders of the present invention comprise between about 60% by weight to about 98.9% by weight neat asphalt, between about 0.1% by weight to about 30% by weight crumb rubber, between about 0.05% by weight to about 5% by weight of one or more acids, and between about 0.01% by weight to about 5% by weight of a cross-linking agent. Optionally, the modified asphalt binder may further comprise between about 0.5% by weight to about 30% by weight of one or more synthetic polymers.

In one embodiment, the modified asphalt binder is comprised of between about 82% by weight and 99% by weight neat asphalt, between about 0.5% by weight and 10% by weight crumb rubber, between about 0.5% by weight to about 3% by weight of one or more acids, and between about 0.01% by weight and 5% by weight of one or more cross-linking agents.

In another embodiment, the modified asphalt binder is comprised of between about 52% by weight and 98.5% by weight neat asphalt, between about 0.5% by weight and 10% by weight crumb rubber, between about 0.5% by weight to about 3% by weight of one or more acids, between about 0.01% by weight and 5% by weight of one or more cross-linking agents, and between about 0.5% by weight to about 30% by weight of one or more synthetic polymers.

Preferred acids for use in the modified asphalt binder of the present invention include phosphoric acid, polyphosphoric acid (more than 100% expressed as orthophosphoric content) ("PPA"), sulfuric acid at more than 90% wt, boric acid, and carboxylic acids such as, for example, adipic acid, citric acid, oxalic acid, tartaric acid, maleic acid, valeric acid, succinic acid, fumaric acid, glutamic acid, phtalic acid, acetic acid, and combinations of the above acids. The invention is not limited in this regard, and any appropriate acid known to those skilled in the art may be used in the modified asphalt binder.

The acid may be added to the asphalt binder in either a solid form or in a liquid solution. Where a solid form of the acid is used, the acid can be either a pure acid, such as boric acid or polyphosphoric acid, or the acidic component may be combined with an inert component for ease of handling, such as for example a $SiO_2$-PPA additive.

Preferred cross-linking agents include sulfur based compounds such as, for example, benzothiazoles, diphenylguanidine, dithiocarbamate, and elementary sulfur and/or a mixtures thereof. The butaphalt crosslinker is also suitable, as are the croslinkers cited in the following United States patents and published applications: U.S. Pat. No. 6,451,886; Application No. 2003144387 and U.S. Pat. No.5,256,710. The invention is not limited in this regard and any appropriate rubber cross-linking agent known to those skilled in the art may be utilized in the present invention.

In those embodiments of the present invention in which a synthetic polymer is used, preferred synthetic polymers include styrene butadiene, styrene butadiene styrene ("SBS") three block, ethylene vinyl acetate, ethylene propylene copolymers, polyvinylchorlide (PVC), nylon, polysterene, polybutadiene, acrylate resins, flurorocarbone resins, phenolic resins, alkyd resins, polyesters, polyethylene (linear or crosslinked), epoxy terpolymer, polypropylene (attactic or isotactic), and combinations of the above polymers. The invention is not limited in this regard, and any appropriate synthetic polymer known to those skilled in the art may be used in the modified asphalt binder.

In a second aspect, the present invention is directed to methods of producing the modified asphalt binder. For those embodiments of the present invention which do not include a synthetic polymer additive, the preferred methods for manufacturing the modified asphalt binder comprise the steps of (1) heating the asphalt to a temperature of between about 120° C. and about 200° C., (2) adding a first modifying ingredient, (3) mixing the asphalt and the first modifying ingredient with a high shear mixer, such as, for example, a rotor-stator type mixer (i.e. a SILVERSON type mixer) for a period of between about 5 minutes and about 10 hours, (4) adding a second modifying ingredient to the modified asphalt binder, (5) mixing the second modifying ingredient and the modified asphalt binder in a high shear mixer for a period of between about 5 minutes and about 10 hours, (6) adding a third modifying ingredient to the modified binder material, and (7) agitating the third modifying ingredient and the modified asphalt binder in a low shear mixer (such as, for example, a propeller type mixer driven by a motor at about 250 rpm, similar to an IKA type lab mixer) for a period of between about 5 minutes and about 48 hours.

In these embodiments of the methods of the present invention, the first modifying ingredient may be either crumb rubber or one or more acids. Where the first modifying ingredient is crumb rubber, the second modifying ingredient is the cross-linking agent, and the third modifying ingredient is one or more acids. Alternatively, where the first modifying ingredient is one or more acids, the second modifying ingredient is crumb rubber and the third modifying ingredient is a cross-linking agent. Preferably, crumb rubber is added to the asphalt to achieve a crumb rubber level of between about 0.1% by weight and about 30% by weight in the final modified asphalt material, one or more acids are added to achieve a total acid concentration of between about 0.05% by weight and about 5% by weight in the modified asphalt material, and the cross-linking agent is added to achieve a level of between about 0.01% by weight to about 5% by weight of the cross-linking agent.

In other embodiments of the methods of the present invention, one or more synthetic polymers are added to the modified asphalt composition. In these embodiments of the present invention, the preferred methods of modifying the asphalt binder generally include the steps of (1) heating the asphalt to a temperature of between about 120° C. and about 200° C., (2) adding a first modifying ingredient, (3) mixing the asphalt and the first modifying ingredient with a high shear mixer, such as, for example, a rotor-stator type mixer (i.e. a SILVERSON type mixer) for a period of between about 5 minutes and about 10 hours, (4) adding a second modifying ingredient to the modified asphalt binder, (5) mixing the second modifying ingredient and the modified asphalt binder in a high shear mixer for a period of between about 5 minutes and about 10 hours, (6) adding a third modifying ingredient to the modified binder material, (7) optionally, mixing the third modifying ingredient and the modified asphalt binder for a period of between about 5 minutes and about 10 hours, (8) adding a fourth modifying agent to the modified binder material, and (9) agitating the fourth modifying ingredient and the modified asphalt binder in a low shear mixer (such as, for example, a propeller type mixer driven by a motor at about 250 rpm, similar to an IKA type lab mixer) for a period of between about 5 minutes and about 48 hours.

The modifying ingredients used in these embodiments of the methods are crumb rubber, one or more acids, one or more synthetic polymers, and a cross-linking agent as described above. The crumb rubber, acids and synthetic polymers may be added to the asphalt in any order. The cross-linking agent is added to the asphalt after the crumb rubber has been added, but the cross-linking agent may be added before or after either the acids or the polymers.

In these embodiments of the methods of the present invention, crumb rubber is added to the asphalt to achieve a crumb rubber level of between about 0.1% by weight and about 30% by weight in the final modified asphalt material, one or more acids are added to achieve a total acid concentration of between about 0.05% by weight and about 5% by weight in the modified asphalt material, one or more synthetic polymers are added to achieve a total polymer concentration of between about 0.5% by weight and about 30% by weight, and the cross-linking agent is added to achieve a level of between about 0.01% by weight to about 5% by weight of the cross-linking agent.

It will be understood by those skilled in the art that low shear mixers may be used in place of high shear mixers in the methods described above depending upon the temperatures and the mixing times used, and one skilled in the art can readily determine the appropriate mixing times based upon the temperature and the additive materials used.

The preferred synthetic polymers and the preferred acids used in the methods of the present invention are described above.

Several exemplary embodiments of the methods of the present invention are described below:

Crumb Rubber—Acid—Cross-Linking Agent System

EXAMPLE 1

Neat asphalt is heated to a temperature of between about 120° C. to about 200° C.
Add from between about 0.1% by weight to about 10% by weight of crumb rubber
Mix with high shear mixer for between about 5 minutes to about 10 hours
Add from between about 0.01% by weight to about 5% by weight of a cross-linking agent
Mix with a high shear mixer for between about 5 minutes to about 10 hours
Add from between about 0.5% by weight to about 3% by weight of one or more acids
Agitate the modified asphalt obtained with low shear mixer from 5 minutes to 48 hours

EXAMPLE 2

Neat asphalt is heated to a temperature of between about 120° C.
Add from between about 0.5% by weight to about 3% by weight of one or more acids
Mix with high shear mixer for between about 5 minutes to about 10 hours
Add from between about 0.1% by weight to about 10% by weight of crumb rubber
Mix with a high shear mixer for between about 5 minutes to about 10 hours
Add from between about 0.01% by weight to about 5% by weight of a cross-linking agent
Agitate the modified asphalt obtained with low shear mixer from 5 minutes to 48 hours Crumb Rubber—Polymer—Acid—Cross-Linking Agent System

EXAMPLE 3

Neat asphalt is heated to a temperature of between about 120° C. to about 200° C.
Add from between about 0.5% by weight to about 5% by weight of one or more synthetic polymer
Mix with high shear mixer for between about 5 minutes to about 10 hours
Add from between about 0.1% by weight to about 10% by weight of crumb rubber
Mix with a high shear mixer for between about 5 minutes to about 10 hours
Add from between about 0.5% by weight to about 3% by weight of one or more acids
Add from between about 0.01% by weight to about 5% by weight of a cross-linking agent
Agitate the modified asphalt obtained with low shear mixer from 5 minutes to 48 hours

EXAMPLE 4

Neat asphalt is heated to a temperature of between about 120° C. to about 200° C.
Add from between about 0.5% by weight to about 5% by weight of one or more synthetic polymer
Mix with high shear mixer for between about 5 minutes to about 10 hours
Add from between about 0.5% by weight to about 3% by weight of one or more acids
Mix with a high shear mixer for between about 5 minutes to about 10 hours
Add from between about 0.1% by weight to about 10% by weight of crumb rubber
Mix with a high shear mixer for between about 5 minutes to 10 hours
Add from between about 0.01% by weight to about 5% by weight of a cross-linking agent
Agitate the modified asphalt obtained with low shear mixer from 5 minutes to 48 h

EXAMPLE 5

Neat asphalt is heated to a temperature of between about 120° C. to about 200° C.
Add from between about 0.1% by weight to about 10% by weight of crumb rubber
Mix with high shear mixer for between about 5 minutes to about 10 hours
Add from between about 0.5% by weight to about 5% by weight of one or more synthetic polymers
Mix with a high shear mixer for between about 5 minutes to about 10 hours
Add from between about 0.5% by weight to about 3% by weight of one or more acids
Add from between about 0.01% by weight to about 5% by weight of a cross-linking agent
Agitate the modified asphalt obtained with low shear mixer from 5 minutes to 48 hours

EXAMPLE 6

Neat asphalt is heated to a temperature of between about 120° C. to about 200° C.

Add from between about 0.1% by weight to about 10% by weight of crumb rubber
Mix with high shear mixer for between about 5 minutes to about 10 hours
Add from between about 0.5% by weight to about 3% by weight of one or more acids
Mix with a high shear mixer for between about 5 minutes to about 10 hours
Add from between about 0.5% by weight to about 5% by weight of one or more synthetic polymers
Mix with a high shear mixer for between about 5 minutes to about 10 hours
Add from between about 0.01% by weight to about 5% by weight of a cross-linking agent
Agitate the modified asphalt obtained with low shear mixer from 5 minutes to 48 hours

EXAMPLE 7

Neat asphalt is heated to a temperature of between about 120° C. to about 200° C.
Add from between about 0.5% by weight to about 3% by weight of one or more acids
Mix with high shear mixer for between about 5 minutes to about 10 hours
Add from between about 0.5% by weight to about 5% by weight of one or more synthetic polymers
Mix with a high shear mixer for between about 5 minutes to about 10 hours
Add from between about 0.1% by weight to about 10% by weight of crumb rubber
Mix with a high shear mixer for between about 5 minutes to about 10 hours
Add from between about 0.01% by weight to about 5% by weight of a cross-linking agent
Agitate the modified asphalt obtained with low shear mixer from 5 minutes to 48 hours

EXAMPLE 8

Neat asphalt is heated to a temperature of between about 120° C. to about 200° C.
Add from between about 0.5% by weight to about 3% by weight of one or more acids
Mix with high shear mixer for between about 5 minutes to about 10 hours
Add from between about 0.1% by weight to about 10% by weight of crumb rubber
Mix with a high shear mixer for between about 5 minutes to about 10 hours
Add from between about 0.5% by weight to about 5% by weight of one or more synthetic polymers
Mix with a high shear mixer for between about 5 minutes and about 10 hours
Add from between about 0.01% by weight to about 5% by weight of a cross-linking agent
Agitate the modified asphalt obtained with low shear mixer from 5 minutes to 48 hours Tests were conducted to measure the properties of modified asphalt binders using cross-linking agents according to the present invention. In one set of tests, a modified asphalt binder was prepared using only crumb rubber and PPA, while a second modified asphalt binder was prepared using crumb rubber, 0.1% sulfur as a cross-linking agent, and PPA. In both cases, crumb rubber was first added to the asphalt binder and stirred with a high shear mixer for about two hours. For the first modified binder, PPA was added and mixed using a high shear mixer for about 30 minutes. For the second modified binder, sulfur was added and mixed using a high shear mixer for about 15 minutes, followed by addition of PPA and further mixing with a high shear mixer for about 30 minutes. The measured properties of the resulting modified asphalt binders are summarized below in Table 1.

TABLE 1

| | | |
|---|---|---|
| % CR | 5 | 5 |
| % PPA | 0.5 | 0.5 |
| Cross-linker | None | 0.1% S |
| Asphalt | PG 64-22 | PG 64-22 |
| Temperature | 320° C. | 160° C. |
| Visc, cP, 135° C. | 890 | 1020 |
| ER, %, 25° C. | 35 | 45 |
| Top end tru-grade | 72 | 72.9 |
| BBR, Stiffness, MPa | 180 | 205 |
| BBR, m-value | 0.323 | 0.321 |

A series of tests were conducted in which a modified asphalt binder was produced by addition of SBS, polyphosphoric acid and crumb rubber to an asphalt binder. In one of the modified asphalt binders, a cross-linking agent was added to the asphalt binder following the addition of the crumb rubber. The mixing times using a high shear mixer were as follows (mixing times following the addition of each component was the same regardless of the order of addition): following addition of crumb rubber, about 2 hours; following addition of SBS, about 6 hours; following addition of sulfur, about 30 minutes; following addition of PPA, about 30 minutes. The properties of the modified asphalt binders obtained in the tests are summarized in Table 2.

TABLE 2

| Order of addition | SBS-PPA-CR | SBS-CR-PPA | CR-Crosslinker-SBS-PPA |
|---|---|---|---|
| % CR | 5 | 5 | 5 |
| % PPA | 0.5 | 0.5 | 0.5 |
| % SBS | 1.0 | 1.0 | 1.0 |
| Crosslinker, % | None | None | .1% SULFUR |
| Temperature | 160° C. | 160° C. | 160° C. |
| Visc, cP, 135° C. | 1400 | 1320 | 1320 |
| ER, %, 25° C. | 50 | 50 | 57.5 |
| Top end tru-grade, ° C. | 74.4 | 75.6 | 74.8 |
| BBR, Stiffness, MPa | 143 | 156 | 163 |
| BBR, m-value | 0.329 | 0.326 | 0.321 |

As can be seen in the above tables, in each case, the modified asphalt binder containing crumb rubber and a cross-linking agent demonstrated improved elasticity compared to formulations that did not include a cross-linking agent.

The modified asphalt composition may be used in an emulsion type process to apply the asphalt binder material. In one embodiment, the emulsion process comprises the following steps:

1.—the modified asphalt composition is prepared as described above;

2.—an emulsion of the modified asphalt composition obtained in step 1 is prepared by mixing water, the modified asphalt composition and an emulsifier at ambient temperature;

3.—the emulsion obtained in step 2 is spread in order to obtain a uniform layer of the emulsified asphalt binder; and 4.—the emulsion is broken.

Prior to breaking the emulsion, an aggregate material may be spread on the emulsified asphalt binder. Alternatively, the process described above may include an additional step in which aggregate is added, with stirring and at ambient temperature, to the emulsion obtained in step 2 of the process to form an asphalt pavement material. The asphalt pavement material is spread to the desired thickness and the emulsion is broken. The emulsifier may be any appropriate emulsifier known to those skilled in the art. Also, the emulsion may be broken using conventional methods for breaking asphalt emulsions.

It will be recognized by those skilled in the art that the compositions or methods described above may be altered in numerous ways without departing from the scope of the present invention. For example, one or more of the mixing steps described above may be omitted, two or more of the modifying ingredients may be added to the asphalt together or at the same time, or additional modifying agents may be added to the composition to further modify the properties of the composition. Accordingly, the preferred embodiments described herein are intended to be illustrative rather than limiting in nature.

I claim:

1. A modified asphalt binder composition, comprising:
   a. about 60% by weight to about 98.9% by weight asphalt binder material;
   b. about 0.1% by weight to about 30% by weight crumb rubber;
   c. about 0.05% by weight to about 5% by weight of at least one acid selected from the group consisting of phosphoric acid, polyphosphoric acid, sulfuric acid at more than 90% wt, boric acid, adipic acid, citric acid, oxalic acid, tartaric acid, maleic acid, valeric acid, succinic acid, fumaric acid, glutamic acid, phtalic acid, acetic acid, and combinations thereof; and
   d. about 0.01% by weight to about 5% by weight of a cross-linking agent.

2. The composition of claim 1, wherein a substantial portion of the crumb rubber has a particle size of less than 2 mm.

3. The composition of claim 1, wherein the cross-linking agent is elementary sulfur.

4. A method for preparing a pavement material comprising the steps of:
   (a) preparing the modified asphalt binder material of claim 1;
   (b) mixing the modified asphalt binder with water and an emulsifier at ambient temperature to create an asphalt emulsion;
   (c) spreading the asphalt emulsion at a desired thickness; and
   (d) breaking the emulsion.

5. The method of claim 4, wherein prior to the step of spreading the asphalt emulsion, aggregate is mixed with the asphalt emulsion.

6. A method for making a modified asphalt binder composition, comprising the steps of:
   a. providing neat asphalt in an appropriate vessel;
   b. heating the neat asphalt to a temperature of between about 120° C. and about 200° C.;
   c. adding to the neat asphalt a first modifying ingredient wherein the first modifying ingredient is one of crumb rubber or at least one acid selected from the group consisting of phosphoric acid, polyphosphoric acid, sulfuric acid at more than 90% wt, boric acid, adipic acid, citric acid, oxalic acid, tartaric acid, maleic acid, valeric acid, succinic acid, fumaric acid, glutamic acid, phtalic acid, acetic acid, and combinations thereof;
   d. mixing the asphalt and the first modifying ingredient with one of a high shear mixer or a low shear mixer for a period of between about 5 minutes and about 10 hours
   e. adding a second modifying ingredient wherein the second modifying ingredient is one of crumb rubber, at least one acid selected from the group consisting of phosphoric acid, polyphosphoric acid, sulfuric acid at more than 90% wt, boric acid, adipic acid, citric acid, oxalic acid, tartaric acid, maleic acid, valeric acid, succinic acid, fumaric acid, glutamic acid, phtalic acid, acetic acid, and combinations thereof, and a cross-linking agent, wherein the second modifying ingredient is a different type of modifying ingredient than the first modifying ingredient, and the second modifying ingredient may be a cross-linking agent only if the first modifying ingredient is crumb rubber;
   f. mixing the second modifying ingredient and asphalt with one of a high shear mixer or a low shear mixer for a period of between about 5 minutes and about 10 hours;
   g. adding a third modifying ingredient wherein the third modifying ingredient is selected is one of a cross-linking agent or at least one acid selected from the group consisting of phosphoric acid, polyphosphoric acid, sulfuric acid at more than 90% wt, boric acid, adipic acid, citric acid, oxalic acid, tartaric acid, maleic acid, valeric acid, succinic acid, fumaric acid, glutamic acid, phtalic acid, acetic acid, and combinations thereof, wherein the third modifying ingredient is a different type of modifying ingredient than the first modifying ingredient and the second modifying ingredient; and
   h. agitating the third modifying ingredient and asphalt with one of a high shear mixer or a low shear mixer for a period of between about 5 minutes and about 48 hours.

7. The method of claim 6, wherein the step of agitating the third modifying ingredient and the modified binder material is performed in a low shear mixer for a period of between 5 minutes and 10 hours.

8. The method of claim 6, wherein the first modifying ingredient is between about 0.5% by weight and about 30% by weight crumb rubber, the second modifying ingredient is between about 0.01% by weight and about 5% by weight of a cross-linking agent, and the third modifying ingredient is between about 0.05% by weight and about 5% by of at least one acid selected from the group consisting of phosphoric acid, polyphosphoric acid, sulfuric acid at more than 90% wt, boric acid, adipic acid, citric acid, oxalic acid, tartaric acid, maleic acid, valeric acid, succinic acid, fumaric acid, glutamic acid, phtalic acid, acetic acid, and combinations thereof.

9. The method of claim 6, wherein the first modifying ingredient is between about 0.05% by weight and about 5% by weight of at least one acid selected from the group consisting of phosphoric acid, polyphosphoric acid, sulfuric acid at more than 90% wt, boric acid, adipic acid, citric acid, oxalic acid, tartaric acid, maleic acid, valeric acid, succinic acid, fumaric acid, glutamic acid, phtalic acid, acetic acid, and combinations thereof., the second modifying ingredient is between about 0.1% by weight and about 30% by weight of crumb rubber, and the third modifying ingredient is between about 0.01% by weight and about 5% by weight of a cross-linking agent.

10. The method of claim 6, further comprising the step of adding a fourth modifying ingredient to the modified asphalt binder material.

* * * * *